March 11, 1924.
L. SPITZFADEN
1,486,467
WORKHOLDER FOR SCREW THREADING MACHINES
Filed May 28, 1921 3 Sheets-Sheet 1
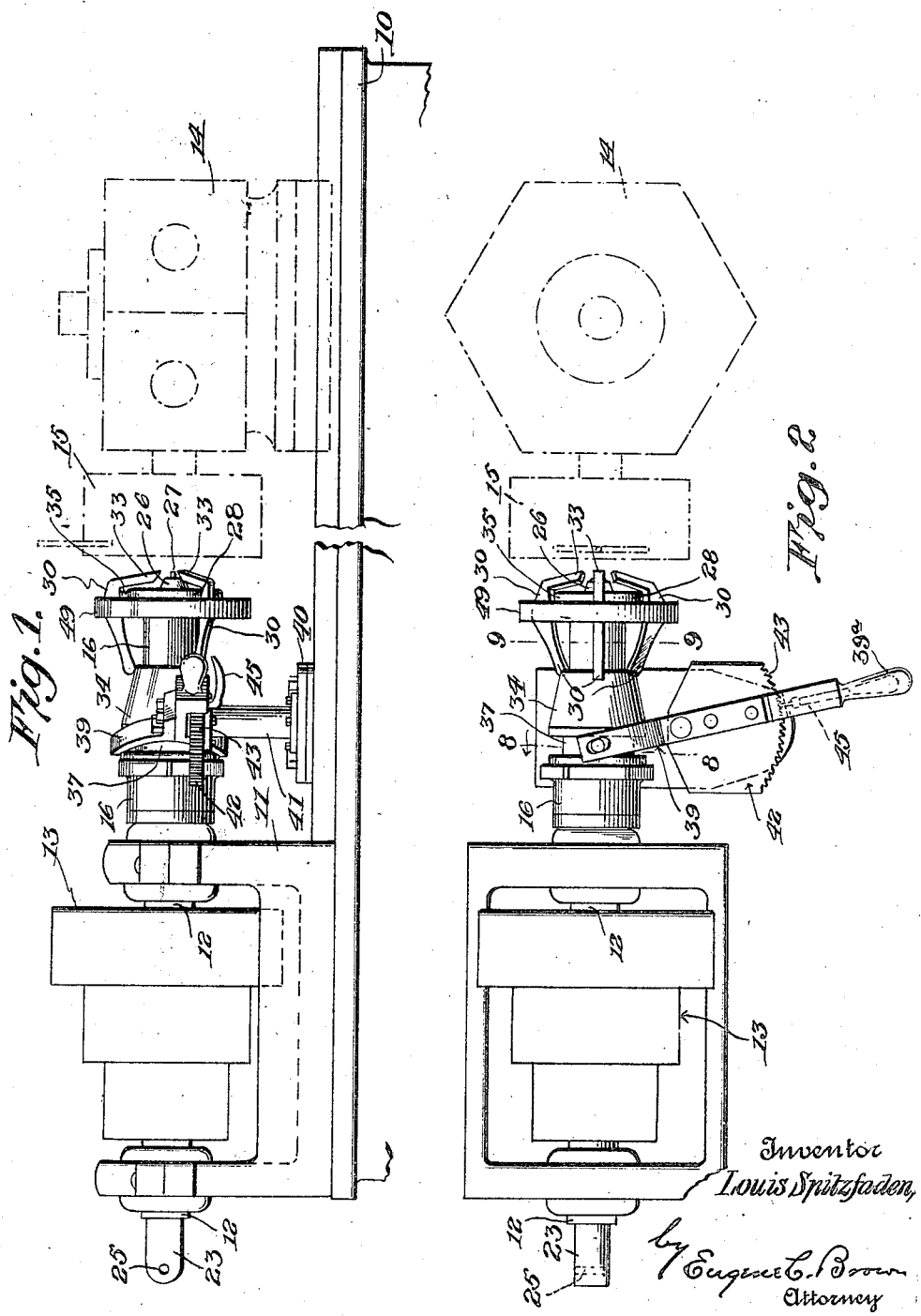

March 11, 1924.
L. SPITZFADEN
1,486,467
WORKHOLDER FOR SCREW THREADING MACHINES
Filed May 28, 1921 3 Sheets-Sheet 2
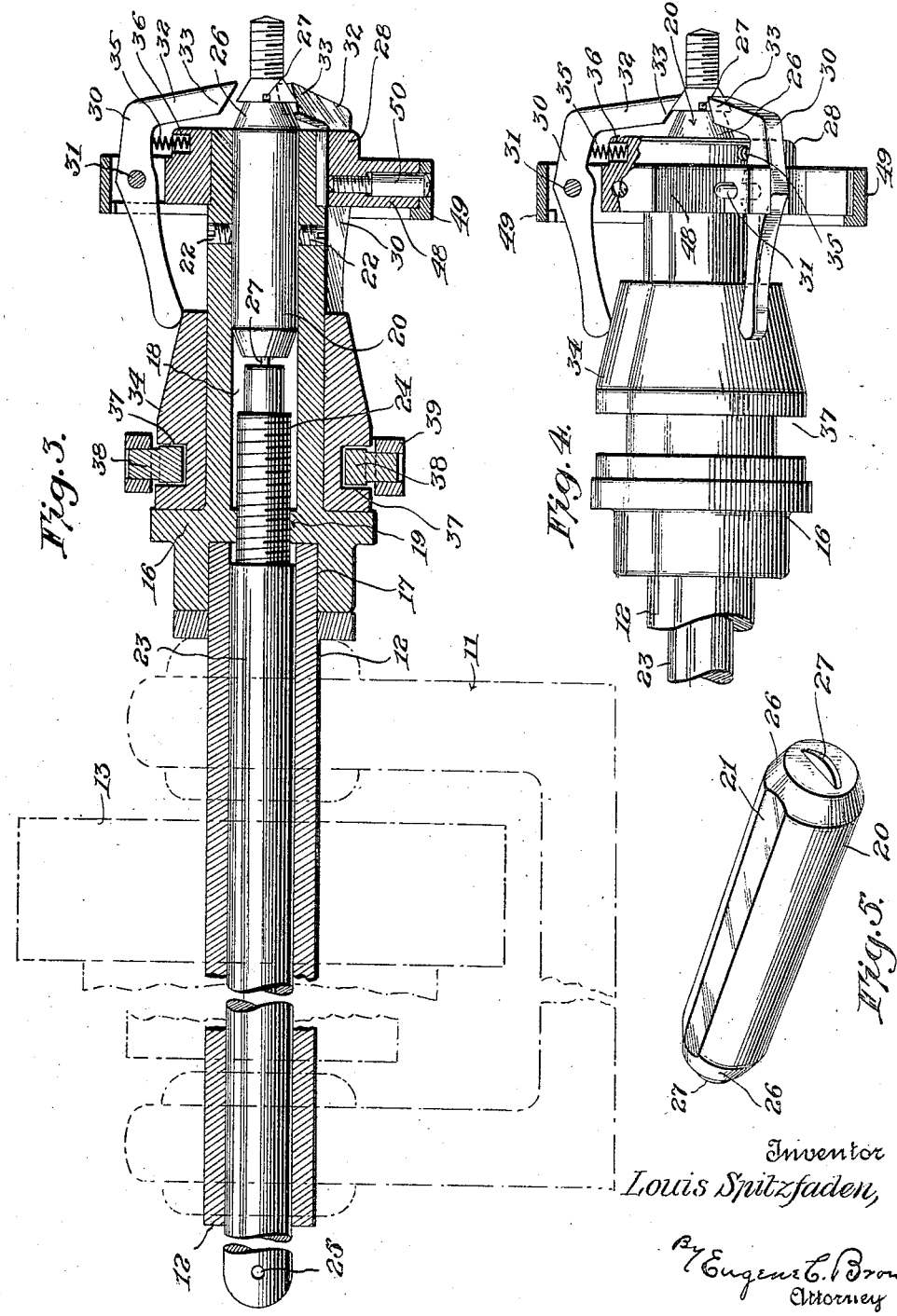
Inventor
Louis Spitzfaden,
By Eugene E. Brown
Attorney March 11, 1924.

L. SPITZFADEN 1,486,467

WORKHOLDER FOR SCREW THREADING MACHINES

Filed May 28, 1921  3 Sheets-Sheet 3

Inventor
Louis Spitzfaden,
by Eugene C. Brown
Attorney

Patented Mar. 11, 1924.

1,486,467

UNITED STATES PATENT OFFICE.

LOUIS SPITZFADEN, OF ELIZABETH, NEW JERSEY, ASSIGNOR TO CHROME STEEL WORKS, OF CHROME, NEW JERSEY, A CORPORATION OF NEW JERSEY.

WORKHOLDER FOR SCREW-THREADING MACHINES.

Application filed May 28, 1921. Serial No. 473,510.

*To all whom it may concern:*

Be it known that I, LOUIS SPITZFADEN, a citizen of the United States, residing at Elizabeth, in the county of Union and State of New Jersey, have invented certain new and useful Improvements in Workholders for Screw-Threading Machines, of which the following is a specification.

This invention relates to chucks and has special reference to a chuck for flat-head screw blanks.

More particularly the invention relates to a chuck for gripping the heads of flat-head screw blanks in such a manner that threads can be cut on such blanks the full length of the screw blank body.

One object of the invention is to provide an improved construction of chuck wherein gripping jaws are arranged in such manner as to engage the head of a screw blank in spaced relation to the body whereby a thread cutting tool can be run on the body up to the head without interference by said jaws.

Another object of the invention is to provide a chuck having an improved arrangement of co-operating stop and jaws for holding the screw blank with its heads properly positioned.

Other objects of the invention are to provide an improved form of chuck having novel means to adjust the device for screw heads of different sizes; and to provide improved means in a chuck for holding a screw blank to rotate with the chuck.

With the above and other objects in view, the invention consists in general of certain novel details of construction and combinations of parts hereinafter fully described, illustrated in the accompanying drawings, and specifically claimed.

In the following description I shall refer to the accompanying drawings, in which:—

Figure 1 is a side elevation of a portion of a turret lathe equipped for screw cutting and having the improved chuck applied thereto.

Figure 2 is a plan of a portion of the lathe equipped as in Figure 1.

Figure 3 is an enlarged longitudinal section through the improved chuck.

Figure 4 is an enlarged size view of the chuck with certain parts broken away to better disclose the construction.

Figure 5 is a detail perspective view of the blank driving pin.

Figure 6:
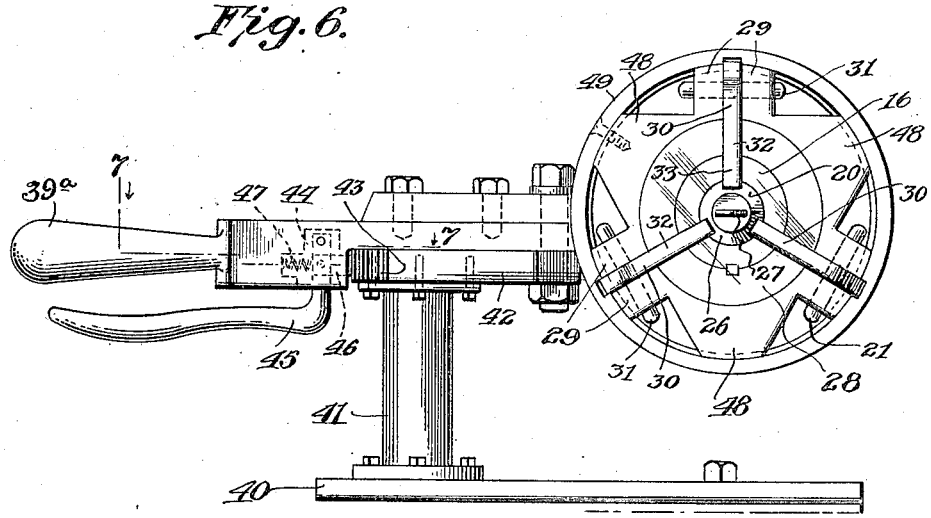
Figure 6 is a face view of the chuck.
Figure 7:
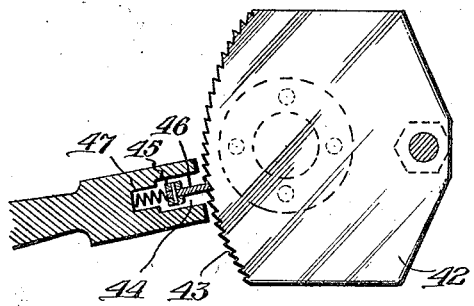
Figure 7 is a detail section on the line 7—7 of Figure 8.
Figure 8:
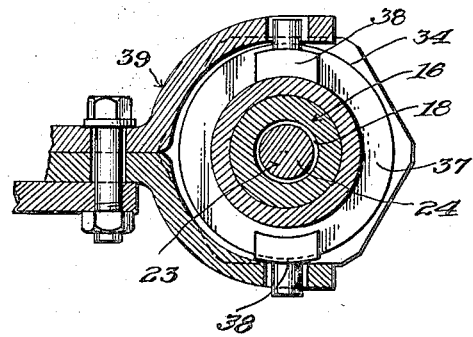
Figure 8 is a detail section on the line 8—8 of Figure 2.
Figure 9:
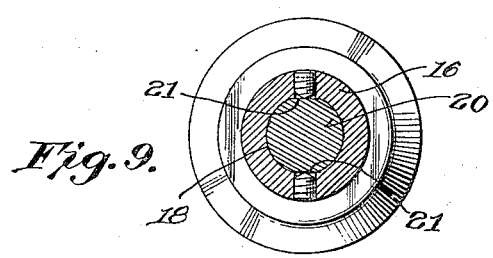
Figure 9 is a detail section on the line 9—9 of Figure 2.

In order to make clear the operation and manner of using the chuck there has been illustrated in the drawings hereunto attached a portion of an ordinary turret lathe having a bed 10, a head-stock 11 provided with a hollow spindle 12 and stepped cone pulley 13, and a turret 14 carrying a well known form of self opening die-head 15. As these parts are old and well-known it is unnecessary here to enter into a detailed description of their construction and operation.

The chuck itself, which forms the invention, comprises a body 16 having a recess 17 in one end to receive the tail end of the hollow spindle 12. The other end of this body is of reduced diameter and is provided with an axial bore 18 extending inward and terminating adjacent the bottom of the recess 17 but in spaced relation thereto, the recess and bore communicating by a threaded opening 19. Slidably mounted in the bore 18 and having one end projecting therefrom is a driving pin 20 which has flats or key-ways 21 extending longitudinally of the pin so that set screws 22 screwed through the forward end of the body 16 may engage in said grooves and cause the driving pin to rotate with the chuck body.

Extending through the hollow spindle 12 is an adjusting bar 23 which has a reduced end 24 threaded to fit the opening 19. This bar is made of sufficient length to project through the hollow spindle and in its projecting end there is provided a transverse opening 25 wherein a cross or capstan pin may be inserted to aid in turning the bar to adjust the length of the portion projecting into the bore 18. The end of this projecting portion engages the inner end of the driving pin 20 and thus, by rotating the bar, the driving pin can be adjusted longitudinally of the body and its frusto-conical end 26 caused to project to the desired extent from said body. Moreover, each end of the driving pin is provided with a rib 27 extending out therefrom to constitute a screw driver bit.

Mounted to the front end of the chuck body 16 is a spider having a body 28 which is keyed securely to the chuck body 16 to rotate therewith. Extending radially from the spider body are forks having arms 29 properly spaced to receive the levers 30, which are pivotally mounted by pins 31 passing through the levers and arms 29. Each of these levers has its front end 32 extending radially toward the axis of the chuck and provided with an extremity 33 bevelled at the proper angles to conform to the standard angle for flat-head screw heads. Slidably mounted on the chuck body 16 is a cone sleeve 34 and the remaining ends of the levers 30 engage on said cone sleeve and are held in such engagement by means of springs 35 each of which has one end engaging beneath the forward end of a respective lever, its other end being seated in a radial recess 36 formed in the spider body 28. Around the cone sleeve extends a shipper groove 37 which receives the pins 38 carried by the arms of a shipper fork 39. Suitably arranged for securing to some convenient part of the lathe is a base 40 carrying a standard 41 supporting a plate 42 to which the shipper fork is pivoted. One edge of this plate is notched to form a toothed segment 43. The shipper fork is recessed as at 44 to receive the end of a bent latch lever 45, the extremity of the lever being pivoted in said recess. This lever has pivoted thereto a latch tooth or pawl 46 which is held in engagement with the toothed segment 43 by a spring 47.

Projecting from the spider body 28 are lugs 48 which carry a guard ring 49 secured in position by a screw 50 so that it may be detached to remove the clutch levers 30.

In operation the screw blank is placed in position between the jaws with the bit 27 engaging the kerf of the head. The shipper lever 39ª is then moved to force the cone sleeve forward and consequently cause the jaws to move inward and grip the bevelled under face of the screw head. If the driver pin has been properly adjusted the jaws will so grip the head that space will be left between the body of the blank and said jaws. The die-head 15 is then run on the body in the usual way with the dies closed, the latch and segment co-operating to hold the jaws in closed position and the engagement of the bit 27 in the screw kerf affording a positive drive for the blank. When the threading operation is complete the dies open and the die-head is moved back. The latch is now released and the shipper lever moved to release the jaws which will open under the influence of the springs 35 and permit the formed screw to drop out of the chuck.

It will be seen that, with this construction, the gripping ends of the jaws move inwardly and toward the end of the driven pin 20 which constitutes an abutment against which the screw head is forced. The screw may be inserted in the chuck while the machine is in motion, holding it either in the fingers or in a short piece of gas pipe, the right hand inserting the screw while the left hand operates the shipper lever to open and close the jaws of the chuck. Considerable time is thus saved which would otherwise be required in stopping and starting the machine.

While the device has been shown and described as applied to a lathe it is obvious that it may be used with a variety of other machines.

Having thus described the invention, what is claimed as new, is:—

In a chuck of the class described, a chuck body having an axial opening extending therethrough, an abutment freely slidable in said body and projecting from the front end thereof, a bar threaded into and projecting from the rear of said chuck and forming a stop for the inner end of the abutment, jaws pivoted to the chuck body and having gripping ends arranged to move inwardly and toward the front end of said abutment, whereby to grasp an object and force it against the abutment means to hold said abutment to rotate with the body, while permitting slidable movement therein, a projection on the end of the abutment arranged to co-operate with a recess in the article to be chucked and hold the same to rotate with the abutment, and means to operate said jaws.

In testimony whereof I affix my signature.

LOUIS SPITZFADEN.